United States Patent
Tsukui et al.

(10) Patent No.: US 8,662,230 B2
(45) Date of Patent: Mar. 4, 2014

(54) SADDLE-TYPE VEHICLE

(71) Applicant: Honda Motor Co., Ltd., Tokyo (JP)

(72) Inventors: Hiroaki Tsukui, Wako (JP); Masato Nagata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/766,030

(22) Filed: Feb. 13, 2013

(65) Prior Publication Data
US 2013/0214553 A1    Aug. 22, 2013

(30) Foreign Application Priority Data
Feb. 16, 2012   (JP) .................................. 2012-031910

(51) Int. Cl.
*B62D 61/02*   (2006.01)

(52) U.S. Cl.
USPC ......................................... 180/219; 180/68.1

(58) Field of Classification Search
USPC ......................... 180/68.1, 68.2, 219; 296/78.1
See application file for complete search history.

(56) References Cited

U.S. PATENT DOCUMENTS

| | | | | |
|---|---|---|---|---|
| 7,537,077 | B2 * | 5/2009 | Nakashima et al. | 180/229 |
| 8,083,017 | B2 * | 12/2011 | Arimura | 180/219 |
| 2013/0026784 | A1 * | 1/2013 | Maeda et al. | 296/181.1 |
| 2013/0057016 | A1 * | 3/2013 | Yamada | 296/78.1 |

FOREIGN PATENT DOCUMENTS

JP    2010-042755    2/2010

* cited by examiner

*Primary Examiner* — Tashiana Adams
(74) *Attorney, Agent, or Firm* — Rankin, Hill & Clark LLP

(57) ABSTRACT

A cowl structure that is small in size and light, and that is effective in preventing air discharged from a radiator from being applied to the legs of the rider. An upper cowl includes ridges projecting laterally outwardly in the transverse direction of the vehicle, slanted surfaces extending from the ridges in the forward direction of the vehicle and directed toward the center of the vehicle, and rear slanted surfaces extending from the ridges in a rearward direction of the vehicle and directed toward the center of the vehicle. The air discharged from the radiator is not applied to the legs of the rider. Since the action is achieved simply by deforming the upper cowl, the cowl can be reduced in size and weight.

20 Claims, 8 Drawing Sheets

SADDLE-TYPE VEHICLE

BACKGROUND OF THE INVENTION

1. Field of the Invention

The present invention relates to a saddle-type vehicle having a seat for the rider to sit on, knee grip members to be sandwiched by the knees of the rider, an upper cowl covering a region forward of the knee grip members, an engine disposed below the knee grip members, a radiator disposed in front of the engine, and left and right radiator shrouds for guiding ram air to the radiator.

2. Description of Related Art

Vehicles that the passenger rides on astride the seat are called saddle-type vehicles. Some saddle-type vehicles have parts covered with a vehicle body cover referred to as a cowl. The cowl improves the appearance of the vehicle and is capable of controlling ram air. Various vehicles with such a cowl have been proposed (see, for example, Japanese Patent Laid-Open No. 2010-42755 (FIG. 7)).

As shown in FIG. 7 of Japanese Patent Laid-Open No. 2010-42755, a radiator unit (51) (a reference numeral in parentheses is that found in Japanese Patent Laid-Open No. 2010-42755; hereinafter the same) is disposed behind a front wheel (25), and left and right middle cowls (78L, 78R) are disposed outwardly of the radiator unit (51). A radiator air inlet (112) is positioned between the left and right middle cowls (78L, 78R), and lower cowls (123L, 123R) are disposed inwardly of rear portions of the left and right middle cowls (78L, 78R).

Part of ram air that is introduced from the radiator air inlet (112) is discharged out of the middle cowls (78L, 78R) through openings (138L, 138R) defined between the middle cowls (78L, 78R) and the lower cowls (123L, 123R), and flow rearwardly of the vehicle. The rider on the saddle-type vehicle has legs placed behind the middle cowls (78L, 78R).

The air flow that is discharged from the openings (138L, 138R) may be mixed with air that has been warmed by the radiator unit (51). When the warmed air is discharged from the openings (138L, 138R), it should not be applied to the legs of the rider.

One solution is to extend the lower cowls (123L, 123R) outwardly in the widthwise directions of the vehicle. However, outwardly extended lower cowls (123L, 123R) are large in size and heavy.

There have been demands for a cowl structure which is small in size and light, and is effective to prevent air discharged from the radiator from being applied to the legs of the rider.

SUMMARY OF THE INVENTION

The present invention is directed toward a cowl structure in a saddle-type vehicle having a radiator disposed forwardly of a rider's seat, the cowl structure being small in size and light, and being effective to prevent air discharged from the radiator from being applied to the legs of the rider.

In accordance with the present invention, a saddle-type vehicle includes a head pipe mounted on a front portion of a vehicle frame, a front wheel supported on the head pipe by a front wheel suspension device, a seat disposed behind the head pipe for a rider to sit thereon, left and right knee grip members disposed between the head pipe and the seat for being sandwiched by the knees of the rider, an upper cowl disposed in covering relation to a portion of the vehicle frame in front of the knee grip members, an engine disposed below the knee grip members, a radiator disposed between the front wheel and the engine, and left and right radiator shrouds disposed laterally in transverse directions of the vehicle for guiding ram air to the radiator.

The upper cowl includes a pair of slanted surfaces disposed above the radiator and extending rearwardly in a covering relation to the front wheel suspension device. The slanted surfaces overlap the knee grip members and are inclined downwardly toward the center of the vehicle in the transverse directions thereof.

The radiator shrouds have respective upper extensions extending upwardly of an upper end of the radiator. The upper extensions have respective upper portions overlapping the slanted surfaces of the upper cowl, as viewed in side elevation, and disposed outwardly of the slanted surfaces in the transverse directions of the vehicle with gaps defined between the upper portions and the slanted surfaces, as viewed in front elevation.

The upper cowl has, in its lower portion, slanted surfaces that are inclined toward the center of the vehicle in the transverse directions thereof. Part of the air that has been warmed by the radiator is discharged along the slanted surfaces out of the vehicle. Since the slanted surfaces are inclined toward the center of the vehicle in the transverse directions thereof, the air is discharged outwardly in the transverse directions of the vehicle. As a result, the warmed air quickly leaves the vehicle and does not tend to be applied to the knees of the rider.

Since only the slanted surfaces need to be provided on the upper cowl, the upper cowl may be reduced in size and weight. According to the present invention, therefore, there is provided a cowl structure in a saddle-type vehicle that has a radiator disposed forwardly of a rider's seat. The cowl structure is small in size and light, and effective to prevent air discharged from the radiator from being applied to the legs of the rider.

A large amount of ram air is introduced through a rectangular opening that is defined between the upper edge of the radiator, the upper extensions of the left and right radiator shrouds, and the upper cowl, as viewed in front elevation, and the introduced ram air is used to cool the engine. Accordingly, even though the vehicle has the cowl, the engine can effectively be cooled by the ram air.

In further accordance with the present invention, the upper portions of the upper extensions of the radiator shrouds are positioned more closely to the center of the vehicle in the transverse directions thereof than respective upper ends of the slanted surfaces of the upper cowl, as viewed in front elevation. Air warmed by the radiator is discharged out of the vehicle through gaps between the upper portions of the upper extensions of the radiator shrouds and the slanted surfaces. Since the slanted surfaces are inclined toward the center of the vehicle in the transverse directions thereof, the slanted surfaces can have a sufficient vertical dimension. As the upper portions of the upper extensions are disposed along the slanted surfaces, the gaps between the upper extensions and the slanted surfaces can have a large vertical dimension. Therefore, a sufficient gap area can be maintained for an increased air discharging capability.

In further accordance with the present invention, the slanted surfaces of the upper cowl have respective upper ends as ridges projecting outwardly in the transverse directions of the vehicle, and the slanted surfaces are inclined from the ridges to the knee grip members in directions toward the center of the vehicle in the transverse directions thereof. The upper ends of the slanted surfaces project as ridges outwardly in the transverse directions of the vehicle, and the slanted surfaces are inclined from the ridges to the knee grip members in directions toward the center of the vehicle in the transverse directions thereof.

The ridges are each defined as a line where two surfaces intersect with each other. Since the ridges project laterally outwardly in the transverse directions of the vehicle, the air flowing along the slanted surfaces leave the ridges outwardly in the transverse directions of the vehicle. Portions of the upper cowl that extend rearwardly from the ridges are constricted toward the center of the vehicle in the transverse directions thereof. Inasmuch as the knees of the rider are held against the constricted portions of the upper cowl, discharged air is less likely to be applied to the knees of the rider.

In further accordance with the present invention, each of the ridges extends to a position that is lower than the upper end of the radiator and that is superposed on an upper portion of the engine, as viewed in side elevation. Since the ridges are vertically long, most of the knees of the rider are protected from the discharged air.

In further accordance with the present invention, lower portions of the radiator shrouds and the slanted surfaces of the upper cowl define therebetween an opening, as viewed in side elevation. Most of the air that has been warmed by the radiator can thus be discharged from between the lower portions of the radiator shrouds and the slanted surfaces. Therefore, the temperature in a space behind the radiator is prevented from rising.

In further accordance with the present invention, the radiator shrouds are free of a hole as viewed in side elevation. If the radiator shrouds had an opening, their rigidity would be lowered. According to the present invention, since the radiator shrouds have no hole, the rigidity thereof is high.

In further accordance with the present invention, the saddle-type vehicle further includes a fuel tank of metal disposed at the center of the vehicle in the transverse directions thereof, as viewed in front elevation, the fuel tank being covered with the left and right knee grip members, which are made of plastics, disposed over outer sides of the fuel tank in the transverses directions of the vehicle. The fuel tank of metal tends to be easily scratched, and any scratches thereon are highly visible. According to the present invention, since the fuel tank of metal is covered by the left and right knee grip members, which are made of plastics, disposed over the outer sides of the fuel tank in the transverses directions of the vehicle, the fuel tank is prevented from being scratched. Even if the knee grip members are scratched, any scratches on plastics are less noticeable than on metal. Therefore, according to the present invention, the knee grip members maintain a good appearance.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
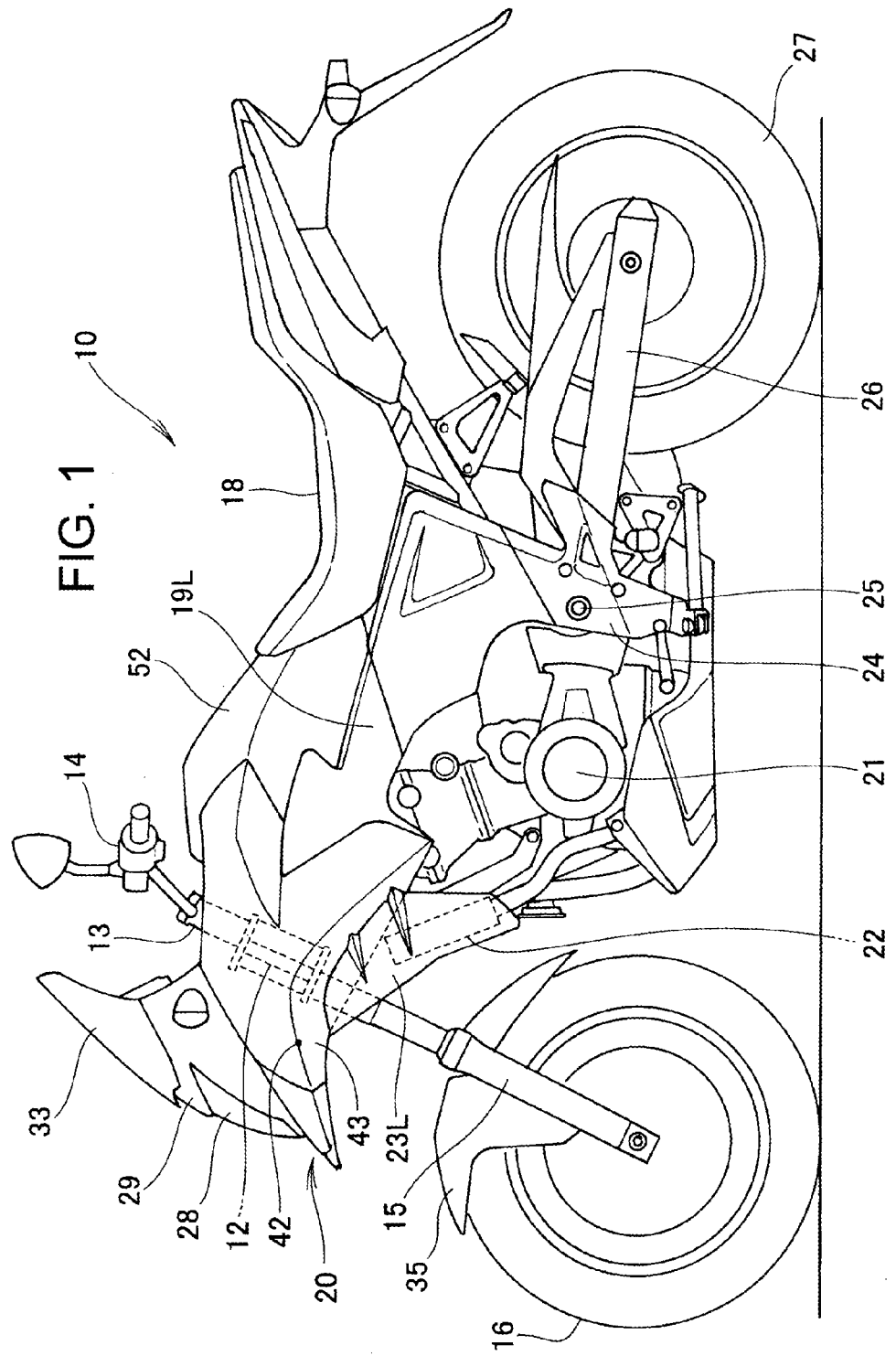
FIG. 1 is a left-hand side elevational view of a saddle-type vehicle according to the present invention.

An embodiment of the present invention will be described below with reference to the drawings. The drawings should be viewed as reference characters are normally seen.

Figure 7:
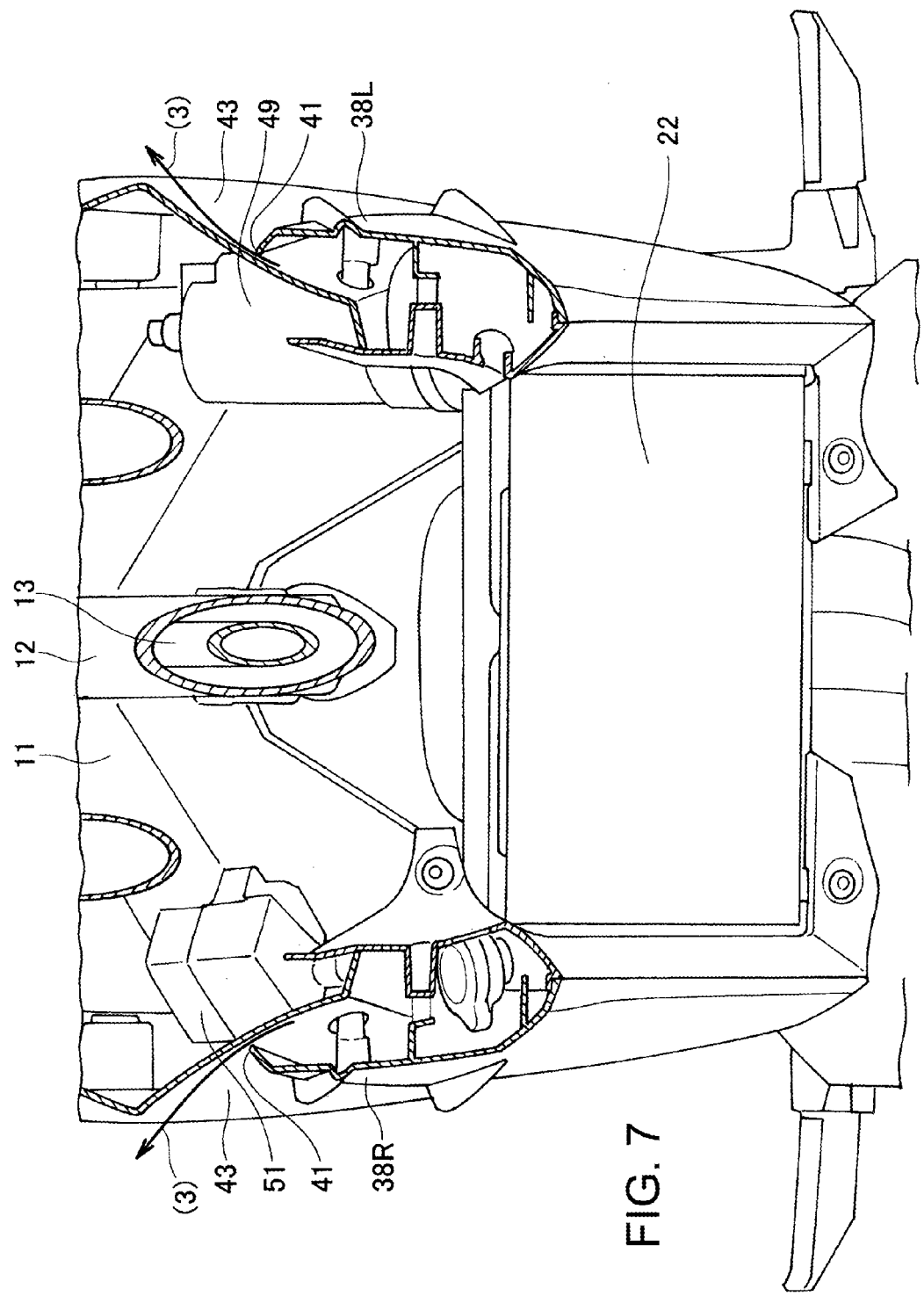
FIG. 7 is a cross-sectional view taken along line 7-7 of FIG. 6.

As shown in FIG. 7, a vehicle frame 11 is provided, and a head pipe 12 is disposed more closely to the viewer of FIG. 7 than the vehicle frame 11, i.e., is mounted on a front portion of the vehicle frame 11. A steering shaft 13 is steerably mounted on the head pipe 12.

As shown in FIG. 1, a steering handle 14 is mounted on the upper end of the steering shaft 13. From the steering shaft 13, there extends downwardly a front wheel suspension device (front fork) 15 having a cushion. A front wheel 16 is rotatably supported on the front wheel suspension device 15.

A saddle-type vehicle 10 shown in FIG. 1 is a saddle-type vehicle having a seat 18 for the rider to sit on behind the head pipe 12. A knee grip member 19L of plastics ("L" used herein is a suffix representing the left side of the rider), against which the rider holds a knee thereof, is disposed between the seat 18 and the head pipe 12. An upper cowl 20 is disposed in covering relation to a portion forward of the knee grip member 19L. An engine 21 is disposed below the knee grip member 19L. A radiator 22 is disposed between the front wheel 16 and the engine 21. A radiator shroud 23L for guiding ram air to the radiator 22 is disposed laterally of the radiator 22 in a transverse direction of the vehicle.

The vehicle frame 11 includes a pivot frame 24 as a rear element thereof. A swing arm 26 is vertically swingably mounted on the pivot frame 24 by a pivot shaft 25. A rear wheel 27 as a drive wheel is rotatably supported on the rear end of the swing arm 26.

Figure 2:
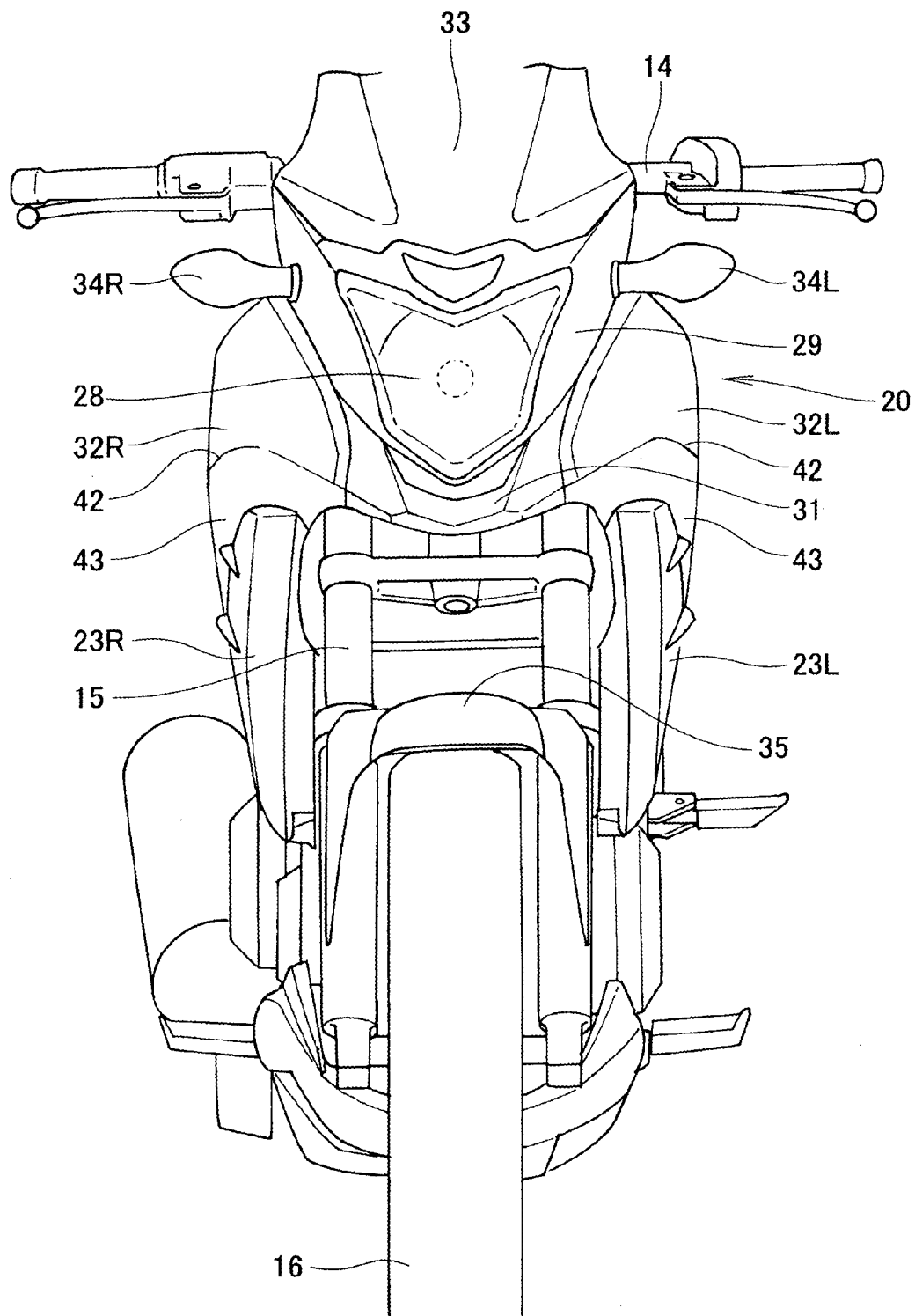
FIG. 2 is a front elevational view of the saddle-type vehicle according to the present invention.

As shown in FIG. 2, the upper cowl 20, which covers a front upper portion of the vehicle, includes a lens side cowl 29 surrounding a head light lens 28 that is disposed above the front wheel 16, a front center cowl 31 disposed below the lens side cowl 29 and extending transversely across the vehicle, and a left upper cowl body 32L and a right upper cowl body 32R ("R" used herein is a suffix representing the right side of the rider) which are disposed leftwardly and rightwardly of the front center cowl 31 and the lens side cowl 29.

A shield 33 extends upwardly from the lens side cowl 29. Left and right direction indicators 34L and 34R are mounted on the lens side cowl 29. Left and right radiator shrouds 23L and 23R are disposed laterally of the left right upper cowl bodies 32L and 32R, respectively, in the transverse directions of the vehicle.

The lower edge of the upper cowl 20, specifically, the front center cowl 31, the inner edges of the left and right radiator shrouds 23L and 23R, and a front fender 35 jointly define a large rectangular opening through which ram air flows into the vehicle frame 11.

The flow of the ram air will be described in specific detail below.

Figure 3:
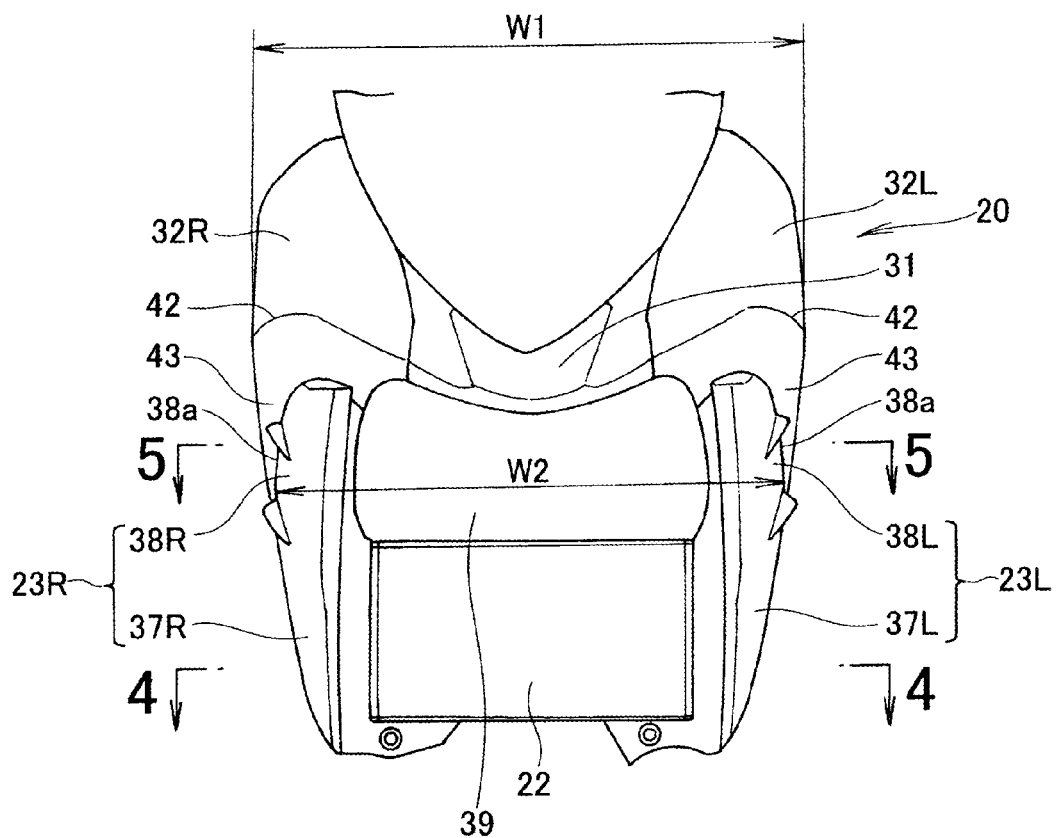
FIG. 3 is a view showing a main portion of the saddle-type vehicle according to the present invention.

FIG. 3 shows a main portion of the saddle-type vehicle 10 illustrated in FIG. 2 with the front wheel 16 and the front wheel suspension device 15 omitted.

As shown in FIG. 3, the left radiator shroud 23L includes a shroud body 37L extending along a left side of the rectangular radiator 22 and an upper extension 38L extending upwardly from the shroud body 37L. Similarly, the right radiator shroud 23R includes a shroud body 37R extending along a right side of the radiator 22 and an upper extension 38R extending upwardly from the shroud body 37R.

Figure 4:
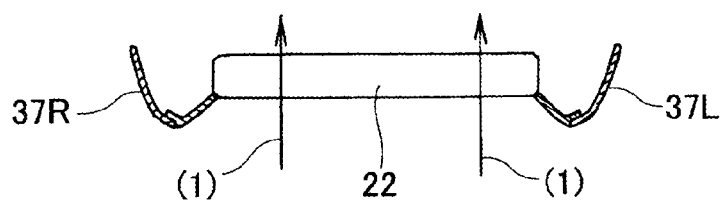
FIG. 4 is a cross-sectional view taken along line 4-4 of FIG. 3.

As shown in FIG. 4, which is a cross-sectional view taken along line 4-4 of FIG. 3, the shroud bodies 37L and 37R, each of a V-shaped cross section which is a pointed front end and which is open in a rearward direction of the vehicle, are disposed leftwardly and rightwardly of the radiator 22. The left and right shroud bodies 37L and 37R serve to guide part of the ram air to the radiator 22 in its entirety (see the arrows (1)). The part of the ram air cools the radiator 22 and is warmed thereby. The warmed air is directed rearwardly of the vehicle.

Figure 5:
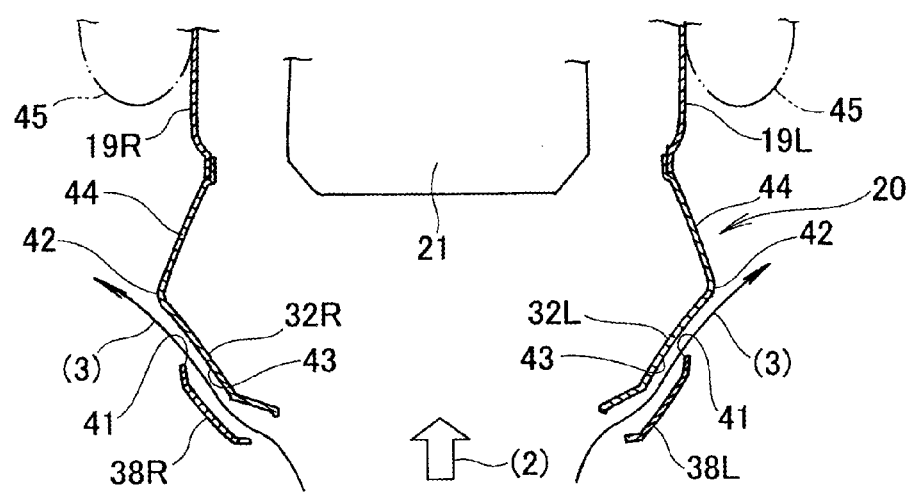
FIG. 5 is a cross-sectional view taken along line 5-5 of FIG. 3.

In FIG. 3, the ram air is introduced through a rectangular opening 39 that is defined by the upper edge of the radiator 22, the upper extensions 38L and 38R of the left and right radiator shrouds 23L and 23R, and the lower edge of the upper cowl 20. The ram air that is introduced through the opening 39 flows as indicated by an outline arrow (2) in FIG. 5, which is a cross-sectional view taken along line 5-5 of FIG. 3, and cools the engine 21.

The air that is warmed by the radiator 22, as indicated by the arrows (1) in FIG. 4, is divided into an air flow that is mixed with the air flow indicated by the outline arrow (2) and another air flow which is not mixed with the air flow. The other air flow, which is warmed by the radiator 22, flows through gaps 41 between the outer surfaces of the upper cowl bodies 32L and 32R and the inner surfaces of the upper extensions 38L and 38R of the left and right radiator shrouds 23L and 23R, and is discharged out of the vehicle, as indicated by the arrows (3).

According to the present invention, ridges 42, which are each defined as a line where two surfaces intersect with each other, project mostly laterally outwardly in the transverse directions of the vehicle. As shown best in FIG. 5, the surfaces in front of the ridges 42 are referred to as slanted surfaces 43 that are inclined away from the center of the vehicle in the transverse directions thereof, and the surfaces behind the ridges 42 are referred to as rear slanted surfaces 44 that are inclined toward the center of the vehicle. The rear slanted surfaces 44 are connected to respective front ends of the knee grip members 19L and 19R. Specifically, the slanted surfaces 43 extend more laterally outward in the transverse directions of the vehicle along the rearward direction thereof. The rear slanted surfaces 44 are inclined more toward the center of the vehicle along the rearward direction thereof.

Rider's knees 45, indicated by the imaginary lines, are held against the knee grip members 19L and 19R, respectively. The knees 45 are positioned behind the ridges 42, respectively. The warmed air flows along the slanted surfaces 43 and is then discharged outwardly in the transverse directions of the vehicle from the ridges 42, as indicated by the arrows (3). As a result, the warm air is not liable to be applied to the knees 45.

Structural details of the upper cowl 20, the radiator shrouds 23L and 23R, and the knee grip members 19L and 19R, which perform their actions as described above, will be described below.

As shown in FIG. 3, as viewed in front elevation, the upper cowl 20 has a transverse maximum width W1, and the radiator shrouds 23L and 23R have a transverse maximum width W2 that is smaller than the a transverse maximum width W1. In other words, respective upper portions 38a of the upper extensions 38L and 38R of the radiator shrouds 23L and 23R are positioned more closely to the center of the vehicle in the transverse directions thereof than the upper ends of the slanted surfaces 43 of the upper cowl 20.

Since the slanted surfaces 43 are inclined away from the center of the vehicle in the transverse directions thereof, the slanted surfaces 43 can have a sufficient vertical dimension. As the upper portions 38a of the upper extensions 38L and 38R are disposed along the slanted surfaces 43, the gaps 41 (FIG. 5) between the upper extensions 38L and 38R and the slanted surfaces 43 can have a large vertical dimension. Therefore, a sufficient gap area (gap×vertical dimension) can be maintained for an increased air discharging capability.

Figure 6:
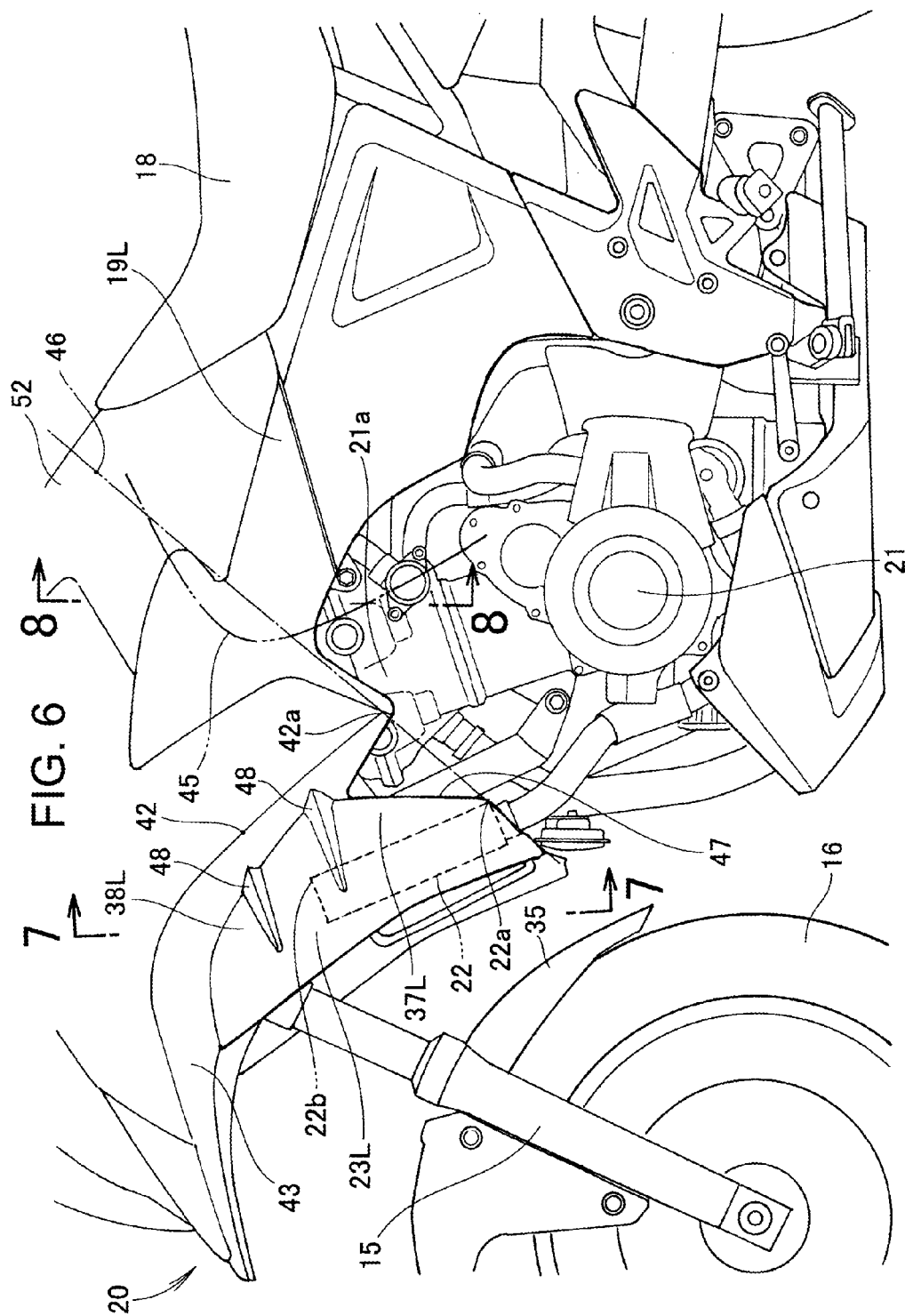
FIG. 6 is a main portion enlarged view of FIG. 1.

As shown in FIG. 6, which is a main portion enlarged view of FIG. 1, a line 46 interconnecting a lower end 22a of the radiator 22 and a lower end 42a of the ridge 42 is positioned behind the front end of the knee 45. In other words, the ridge 42 extends to a position that is lower than an upper end 22b of the radiator 22 and that is superposed on an upper portion 21a, specifically, a head cover, of the engine 21, as viewed in side elevation. Since the ridge 42 extends downwardly and is vertically long, most of the knee 45 of the rider is protected from the discharged air.

As shown in FIG. 6, a lower portion of the radiator shroud 23L, i.e., the shroud body 37L, and the slanted surface 43 define therebetween an inverted V-shaped opening as viewed in side elevation, i.e., a substantially triangular opening 47. Much of the air that has been warmed by the radiator 22 is discharged through the clearance between the lower portion of the radiator shroud 23L and the slanted surface 43 of the upper cowl 20, i.e., through the substantially triangular opening 47. Consequently, the temperature in a space behind the radiator 22, i.e., a space between the radiator 22 and the upper portion 21a of the engine 21, is prevented from rising.

The radiator shroud 23L itself does not have an opening or hole as viewed in side elevation. If the radiator shroud 23L had an opening, the radiator shroud rigidity would be lowered. According to the present invention, since the radiator shroud 23L has no hole, the rigidity thereof is high.

Preferably, the radiator shroud 23L has ribs 48 extending upwardly in the rearward direction of the vehicle. The ribs 48 serve to increase the rigidity of the radiator shroud 23L and improve the appearance of the radiator shroud 23L. The right radiator shroud 23R (FIG. 3) is similarly constructed.

As shown in FIG. 7, which is a cross-sectional view taken along line 7-7 of FIG. 6, the air that has been warmed by the radiator 22 is discharged outwardly in the transverse directions of the vehicle as indicated by the arrows (3), from the gaps 41 between the slanted surfaces 43 and the upper extensions 38L and 38R.

A canister 49 and an electric component 51 are mounted on the vehicle frame 11 inside of the upper cowl 20 and above the upper edge of the radiator 22. Since the ram air that flows as indicated by the outline arrow (2) in FIG. 5 impinges upon the canister 49 and the electric component 51 and cools them, the temperature of the canister 49 and the electric component 51 is prevented from increasing.

Figure 8:
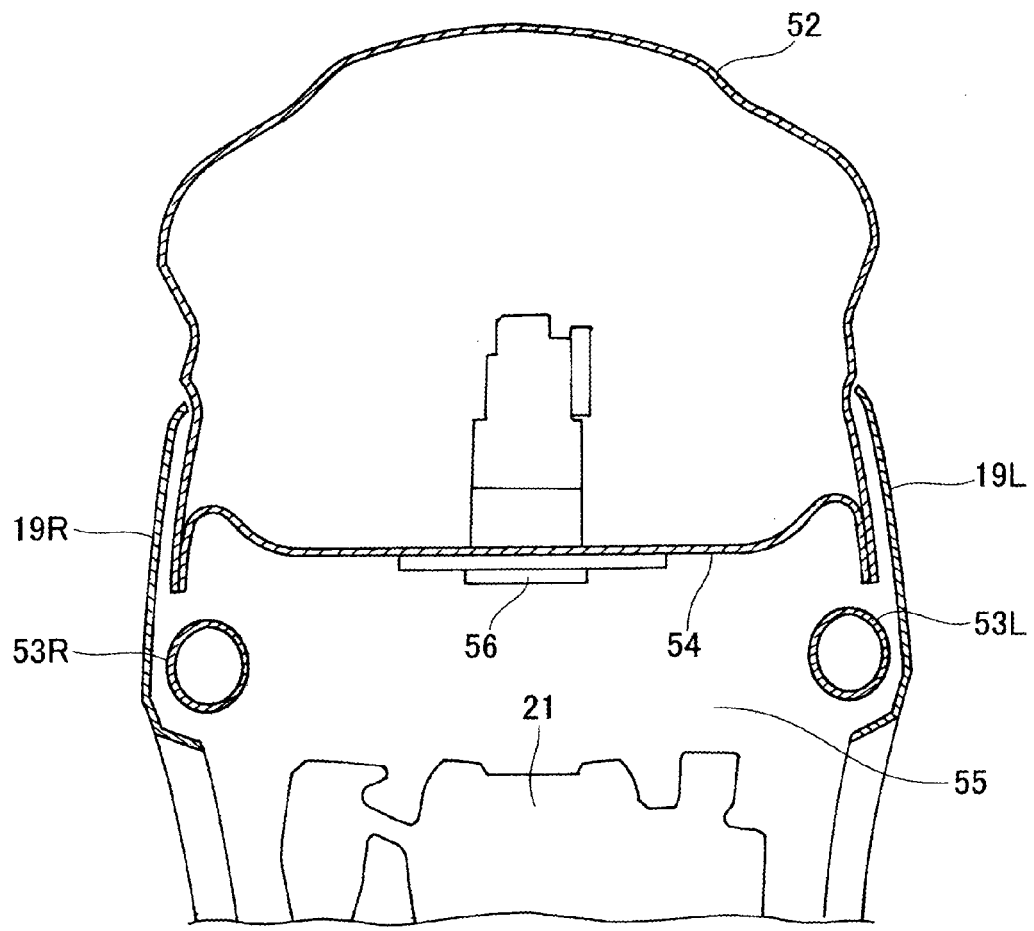
FIG. 8 is a cross-sectional view taken along line 8-8 of FIG. 6.

As shown in FIG. 8, which is a cross-sectional view taken along line 8-8 of FIG. 6, as viewed in front elevation, a fuel tank 52 of metal is disposed at the center of the vehicle in the transverses directions thereof. The fuel tank 52 is covered by the left and right knee grip members 19L and 19R, which are made of plastics, disposed over the outer sides of the fuel tank 52 in the transverses directions of the vehicle.

The fuel tank 52 of metal tends to be easily scratched, and any scratches thereon are highly visible. According to the present invention, since the fuel tank 52 is covered by the left and right knee grip members 19L and 19R, which are made of plastics, disposed over the outer sides of the fuel tank 52 in the transverses directions of the vehicle, the fuel tank 52 is prevented from being scratched. Even if the knee grip members 19L and 19R are scratched, any scratches on plastics are less noticeable than on metal. Therefore, the knee grip members 19L and 19R maintain a good appearance.

As the fuel tank 52 is laterally covered with the knee grip members 19L and 19R, the fuel tank 52 can have a bottom plate 54 thereof positioned above left and right main frames 53L and 53R, which are front elements of the vehicle frame. If it were not for the knee grip members 19L and 19R, the bottom plate 54 of the fuel tank 52 would need to cover the main frames 53L and 53R, and would have to be lowered.

With the bottom plate 54 being positioned above the left and right main frames 53L and 53R, a sufficiently large space 55 is created between the engine 21 and the bottom plate 54 for accommodating a supply pipe and a return pipe for the fuel and a harness therein.

In addition, the bottom plate 54 thus positioned allows a fuel pump 56, which is mounted on the bottom plate 54 by being inserted upwardly therethrough, to be spaced from the engine 21 that is of a relatively high temperature during operation. Accordingly, the temperature of the fuel pump 56 is prevented from rising.

The saddle-type vehicle according to the present invention is illustrated as a two-wheeled motorcycle in the embodiment. However, the present invention is also applicable to a saddle-type three-wheeled vehicle or a saddle-type four-wheeled vehicle. The present invention is applicable to a front structure of a saddle-type vehicle.

DESCRIPTION OF REFERENCE SYMBOLS

10 . . . Saddle-type vehicle, 11 . . . Vehicle frame, 12 . . . Head pipe, 15 . . . Front wheel suspension device, 16 . . . Front wheel, 18 . . . Seat, 19L, 19R . . . Knee grip member, 20 . . . Upper cowl, 21 . . . Engine, 22 . . . Radiator, 23L, 23R . . . Radiator shroud, 38L, 38R . . . Upper extension, 41 . . . Gap, 42 . . . Ridge, 43 . . . Slanted surface, 47 . . . Opening, 52 . . . Fuel tank.

What is claimed is:

1. A saddle-type vehicle including a head pipe mounted on a front portion of a vehicle frame, a front wheel supported on said head pipe by a front wheel suspension device, a seat disposed behind said head pipe for a rider to sit thereon, left and right knee grip members disposed between said head pipe and said seat for being sandwiched by the knees of the rider, an upper cowl disposed in covering relation to a portion of the vehicle frame in front of said knee grip members, an engine disposed below said knee grip members, a radiator disposed between said front wheel and said engine, and left and right radiator shrouds disposed laterally in transverse directions of the vehicle for guiding ram air to said radiator, wherein said upper cowl includes a pair of slanted surfaces disposed above said radiator and extending rearwardly in covering relation to said front wheel suspension device, said slanted surfaces overlap said knee grip members and are inclined downwardly toward a center of the vehicle in the transverse directions thereof; and said radiator shrouds have respective upper extensions extending upwardly of an upper end of said radiator, said upper extensions having respective upper portions overlapping said slanted surfaces of said upper cowl as viewed in side elevation and disposed outwardly of said slanted surfaces in the transverse directions of the vehicle with gaps defined between said upper portions and said slanted surfaces, as viewed in front elevation.

2. The saddle-type vehicle according to claim 1, wherein the upper portions of said upper extensions of said radiator shrouds are positioned more closely to the center of the vehicle in the transverse directions thereof than respective upper ends of said slanted surfaces of said upper cowl, as viewed in front elevation.

3. The saddle-type vehicle according to claim 1, wherein said slanted surfaces of said upper cowl have respective upper ends as ridges projecting most outwardly in the transverse direction of the vehicle, and said slanted surfaces are inclined from said ridges to said knee grip members in directions toward the center of the vehicle in the transverse direction thereof.

4. The saddle-type vehicle according to claim 3, wherein each of said ridges extends to a position that is lower than the upper end of said radiator and that is superposed on an upper portion of said engine.

5. The saddle-type vehicle according to claim 1, wherein lower portions of said radiator shrouds and said slanted surfaces of said upper cowl define therebetween an opening.

6. The saddle-type vehicle according to claim 1, wherein said radiator shrouds are free of a hole.

7. The saddle-type vehicle according to claim 1, further including a fuel tank of metal disposed at the center of the vehicle in the transverse direction thereof, said fuel tank being covered with said left and right knee grip members, which are made of plastics and disposed over outer sides of the fuel tank.

8. The saddle-type vehicle according to claim 2, wherein said slanted surfaces of said upper cowl have respective upper ends as ridges projecting most outwardly in the transverse direction of the vehicle, and said slanted surfaces are inclined from said ridges to said knee grip members in directions toward the center of the vehicle in the transverse direction thereof.

9. The saddle-type vehicle according to claim 8, wherein each of said ridges extends to a position that is lower than the upper end of said radiator and that is superposed on an upper portion of said engine.

10. The saddle-type vehicle according to claim 2, wherein lower portions of said radiator shrouds and said slanted surfaces of said upper cowl define therebetween an opening.

11. The saddle-type vehicle according to claim 2, wherein said radiator shrouds are free of a hole.

12. The saddle-type vehicle according to claim 2, further including a fuel tank of metal disposed at the center of the vehicle in the transverse direction thereof, said fuel tank being covered with said left and right knee grip members, which are made of plastics and disposed over outer sides of the fuel tank.

13. The saddle-type vehicle according to claim 3, wherein lower portions of said radiator shrouds and said slanted surfaces of said upper cowl define therebetween an opening.

14. The saddle-type vehicle according to claim 3, wherein said radiator shrouds are free of a hole.

15. The saddle-type vehicle according to claim 3, further including a fuel tank of metal disposed at the center of the vehicle in the transverse direction thereof, said fuel tank being covered with said left and right knee grip members, which are made of plastics and disposed over outer sides of the fuel tank.

16. The saddle-type vehicle according to claim 4, wherein lower portions of said radiator shrouds and said slanted surfaces of said upper cowl define therebetween an opening.

17. The saddle-type vehicle according to claim 4, wherein said radiator shrouds are free of a hole.

18. The saddle-type vehicle according to claim 4, further including a fuel tank of metal disposed at the center of the vehicle in the transverse direction thereof, said fuel tank being covered with said left and right knee grip members, which are made of plastics and disposed over outer sides of the fuel tank.

19. The saddle-type vehicle according to claim 5, wherein said radiator shrouds are free of a hole.

20. The saddle-type vehicle according to claim 5, further including a fuel tank of metal disposed at the center of the vehicle in the transverse direction thereof, said fuel tank being covered with said left and right knee grip members, which are made of plastics and disposed over outer sides of the fuel tank.

* * * * *